US011957951B2

(12) United States Patent
Park

(10) Patent No.: US 11,957,951 B2
(45) Date of Patent: Apr. 16, 2024

(54) PEDAL FOR BICYCLE

(71) Applicant: CARDIOHEALTHKOREA CO., LTD., Incheon (KR)

(72) Inventor: Hee-Jae Park, Seongnam-si (KR)

(73) Assignee: CARDIOHEALTHKOREA CO., LTD., Incheon (KR)

(*) Notice: Subject to any disclaimer, the term of this patent is extended or adjusted under 35 U.S.C. 154(b) by 0 days.

(21) Appl. No.: 18/004,676

(22) PCT Filed: Jul. 2, 2021

(86) PCT No.: PCT/KR2021/008426
§ 371 (c)(1),
(2) Date: Jan. 9, 2023

(87) PCT Pub. No.: WO2022/014921
PCT Pub. Date: Jan. 20, 2022

(65) Prior Publication Data
US 2023/0241449 A1  Aug. 3, 2023

(30) Foreign Application Priority Data

Jul. 14, 2020 (KR) .................. 10-2020-0086887

(51) Int. Cl.
*A63F 13/212* (2014.01)
*A63B 21/00* (2006.01)
(Continued)

(52) U.S. Cl.
CPC ...... *A63B 21/4034* (2015.10); *A63B 24/0062* (2013.01); *B62M 3/08* (2013.01); *A63B 2220/24* (2013.01); *A63B 2220/833* (2013.01)

(58) Field of Classification Search
CPC ............ A63B 21/4034; A63B 24/0062; A63B 2220/24; A63B 2220/833; A63B 21/00;
(Continued)

(56) References Cited

U.S. PATENT DOCUMENTS 5,449,332 A    9/1995 Hervig
2012/0125148 A1* 5/2012 Inoue ............... B62M 3/086
                                                    74/594.6
(Continued)

FOREIGN PATENT DOCUMENTS

CN    101568318 A  * 10/2009    ........... A61H 1/0266
CN    203937811 U    11/2014
(Continued)

OTHER PUBLICATIONS

Translation of CN 101568318A, Ochi et al., Oct. 28, 2009 (Year: 2009).*
(Continued)

*Primary Examiner* — Vinh Luong

(57) ABSTRACT

A pedal for a bicycle is disclosed. The pedal for a bicycle comprises a case which can rotate about a spindle; a top plate which is connected to the case by a pivot shaft and can rotate about the pivot shaft; a displacement generating assembly which is disposed in the case and is connected to the case and the top plate so as to generate displacement according to the rotation of the top plate; and a sensing unit which is connected to the displacement generating assembly so as to sense the displacement.

9 Claims, 7 Drawing Sheets

(51) Int. Cl.
*A63B 24/00* (2006.01)
*B62M 3/08* (2006.01)
*G05G 1/30* (2008.04)
*G05G 1/38* (2008.04)
*G05G 5/05* (2006.01)
*G05G 9/02* (2006.01)

(58) Field of Classification Search
CPC ......... A63B 22/06; A63B 23/04; A63B 24/00;
A63B 22/0605; A63B 23/0476; A63B
2220/20; B62M 3/08
USPC .............................................. 74/594.4, 594.6
See application file for complete search history.

(56) References Cited

U.S. PATENT DOCUMENTS

| | | | | |
|---|---|---|---|---|
| 2014/0224062 | A1* | 8/2014 | Vigliotti | B62M 3/086 74/594.6 |
| 2021/0228929 | A1* | 7/2021 | Mischi | B62M 3/16 |
| 2021/0323634 | A1* | 10/2021 | Ball | A43B 5/0421 |
| 2021/0402291 | A1* | 12/2021 | Shin | A63F 13/245 |

FOREIGN PATENT DOCUMENTS

| | | | | |
|---|---|---|---|---|
| EP | 3733493 | A1 * | 11/2020 | B62M 3/08 |
| JP | 2017013657 | A | 1/2017 | |
| KR | 1020150023189 | A | 3/2015 | |
| KR | 20160039527 | A * | 4/2016 | A63B 24/0087 |
| KR | 1020160039527 | A | 4/2016 | |

OTHER PUBLICATIONS

Machine translation of KR 20160039527A, Jeon et al., Apr. 11, 2016 (Year: 2016).*
KR10-2020-0086887 Office Action dated Sep. 27, 2021.
PCT/KR2021/008426 Search Report dated Nov. 1, 2021.
PCT/KR2021/008426 Written Opinion dated Nov. 1, 2021.

* cited by examiner

PEDAL FOR BICYCLE

CROSS REFERENCE TO RELATED APPLICATIONS

This application is a 371 National Stage application of International Application No. PCT/KR2021/008426 dated Jul. 2, 2021, which claims priority of Korea Patent (KR) application Serial Number 10-2020-0086887, filed on Jul. 14, 2020, all of which are incorporated herein by reference in their entireties.

TECHNICAL FIELD

The present disclosure relates to a pedal for a bicycle, and more particularly, to a pedal for a bicycle, which can precisely measure the quantity of exercise of a bicycle rider.

BACKGROUND ART

Bicycle riding is exercise that develops a cardiorespiratory function like other aerobic exercises, such as walking and running. Bicycle exercise is very useful exercise, which enables a diversion while providing physical activities for health, because bicycle exercise is interesting compared to other exercise. In particular, bicycle riding is exercise that is possible in a room as well as the outside. Bicycle riding helps the physical strength improvement of a person with weak lower extremity, a person with a bad joint or waist, and a person with osteoporosis.

In bicycle riding in a room, the quantity of exercise of a bicycle rider may be adjusted by adjusting a load. For example, if a load is increased, a bicycle rider needs to step on a pedal for a bicycle with greater power. That is, greater pressure acts on the pedal for a bicycle. In a conventional technology, the quantity of exercise of a bicycle rider is calculated as the RPM of a pedal for a bicycle. However, a force of a bicycle rider that steps on the pedal for a bicycle may be different depending on a load of the bicycle. The quantity of exercise of a bicycle rider is further increased depending on the force of the bicycle rider that steps on the pedal. Accordingly, in the conventional technology, there is a problem in that the quantity of exercise of a bicycle rider cannot be accurately and precisely calculated.

Although a rider rides a bicycle on the outside, when the rider rides the bicycle along an uphill road or rides on the bicycle along a flat land, the quantity of exercise of a bicycle rider is different. If the pedal for a bicycle is rotated at the same RPM, a bicycle rider has to step on the pedal for a bicycle with greater power when riding the bicycle on the uphill road. Accordingly, when the rider rides the bicycle on the outside, there is a problem in that the accurate quantity of exercise cannot be measured if the quantity of exercise is measured based on only the RPM of the pedal for a bicycle.

DISCLOSURE

Technical Problem

An embodiment of the present disclosure has an object of providing a pedal for a bicycle, which can precisely calculate the quantity of exercise of a bicycle rider.

Technical Solution

In order to achieve the above object, a pedal for a bicycle according to an embodiment of the present disclosure includes a case capable of rotating around a spindle, an upper plate connected to the case by a pivot shaft and capable of rotating around the pivot shaft, a displacement generation assembly disposed within the case, connected to the case and the upper plate, and configured to generate a displacement in response to the rotation of the upper plate, and a sensing unit connected to the displacement generation assembly and configured to detect a displacement.

Furthermore, the sensing unit is moved along a predetermined trajectory between the case and the upper plate by the displacement generation assembly.

Furthermore, the trajectory of the sensing unit is parallel to the pivot shaft.

Furthermore, the pivot shaft and the spindle are parallel to each other.

Furthermore, the displacement generation assembly includes a main moving part connected to the upper plate, and a follower moving part connected to the case, displaced by the main moving part, and configured to move the sensing unit along the predetermined trajectory.

Furthermore, any one of the main moving part and the follower moving part includes a roller, and the other of the main moving part and the follower moving part includes a contact part having at least one of an inclined surface or a curved surface.

Furthermore, the follower moving part is rotated around a displacement axis by the main moving part.

Furthermore, the displacement axis is perpendicular to one plane through which the predetermined trajectory of the sensing unit passes.

Furthermore, the sensing unit is spaced apart from the displacement axis and disposed toward the pivot shaft.

Furthermore, the sensing unit senses at least one of a rotation angle and a linear displacement quantity for one axis.

Advantageous Effects

According to the present disclosure, the quantity of exercise of a bicycle rider can be precisely measured.

Furthermore, the quantity of exercise of a bicycle rider can be accurately calculated.

Furthermore, the displacement generation assembly can precisely and accurately measure the quantity of rotation (displacement quantity) of the upper plate through a simple structure in spite of spatial limitations.

MODE FOR DISCLOSURE

Hereinafter, a pedal 1 for a bicycle according to a preferred embodiment of the present disclosure is described in detail.

Figure 1:
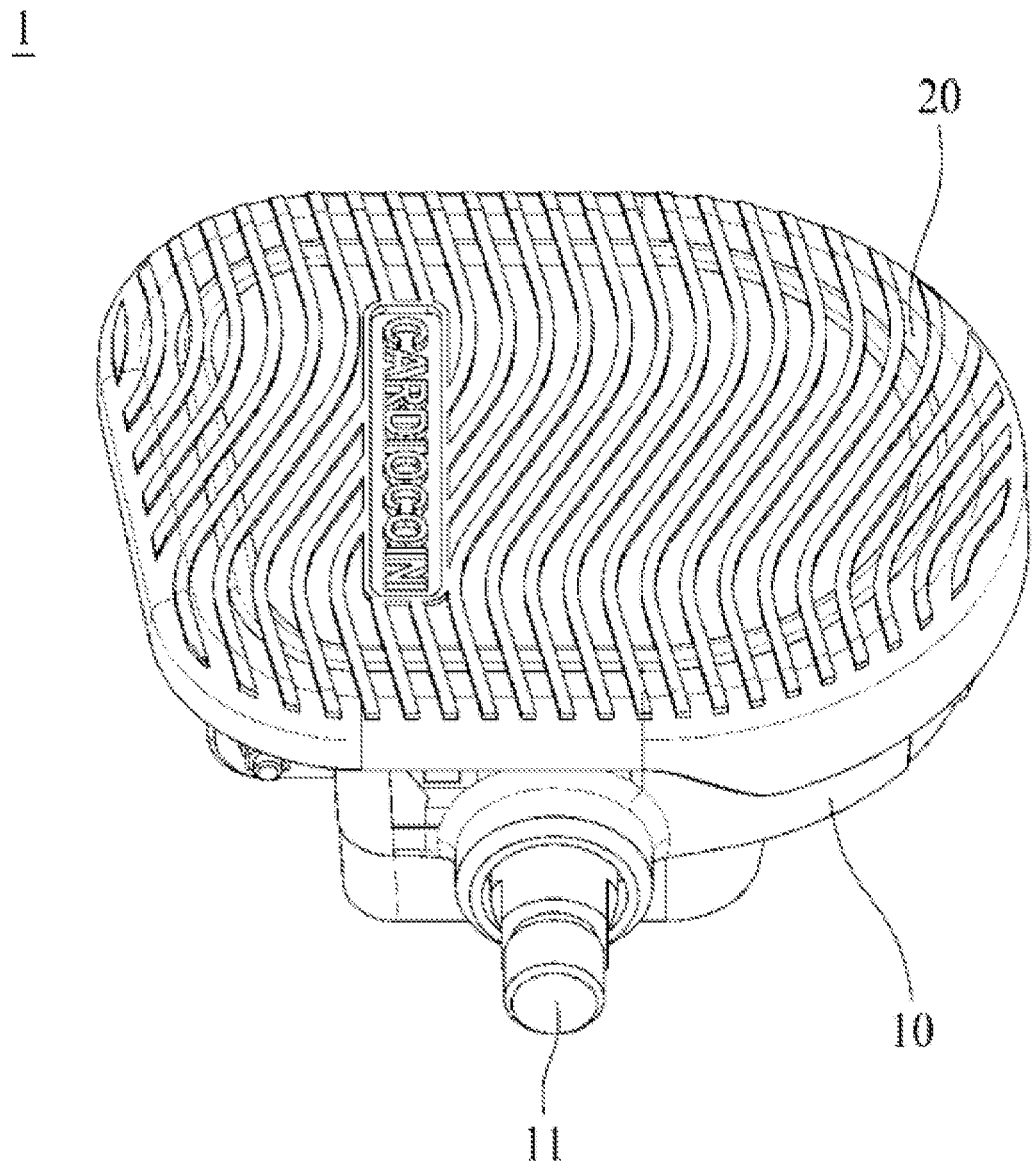
FIG. 1 is a perspective view schematically illustrating a pedal for a bicycle according to an embodiment of the present disclosure.
Figure 2:
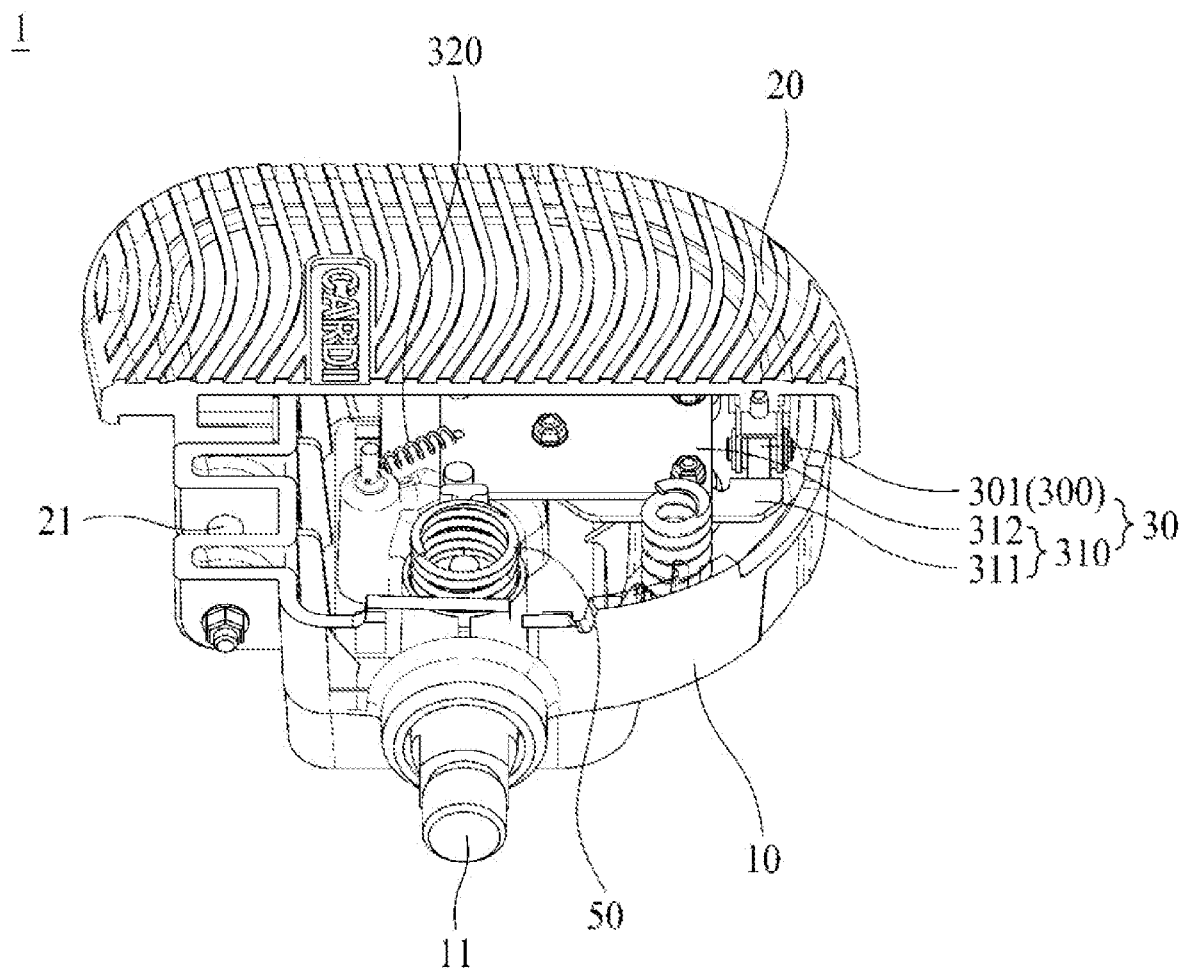
FIG. 2 is a diagram illustrating the inside of the pedal for a bicycle illustrated in FIG. 1.
Figure 3:
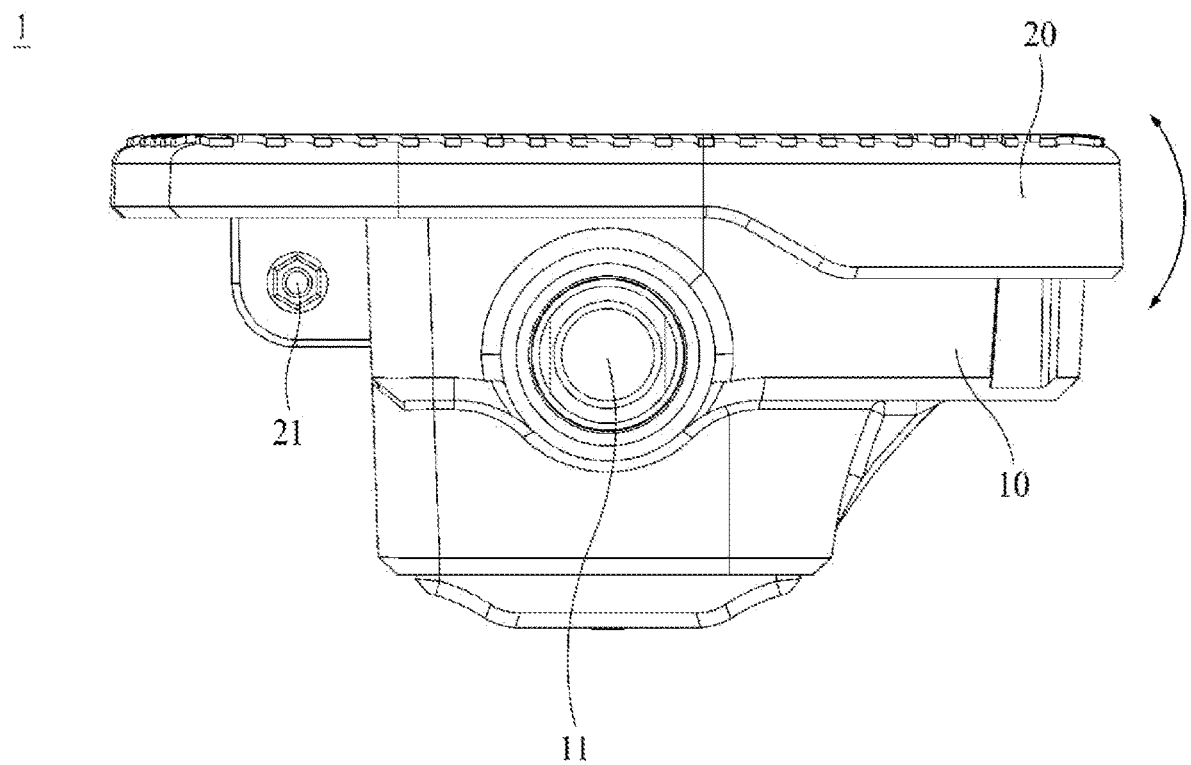
FIG. 3 is a side view of the pedal for a bicycle illustrated in FIG. 1.
Figure 4:
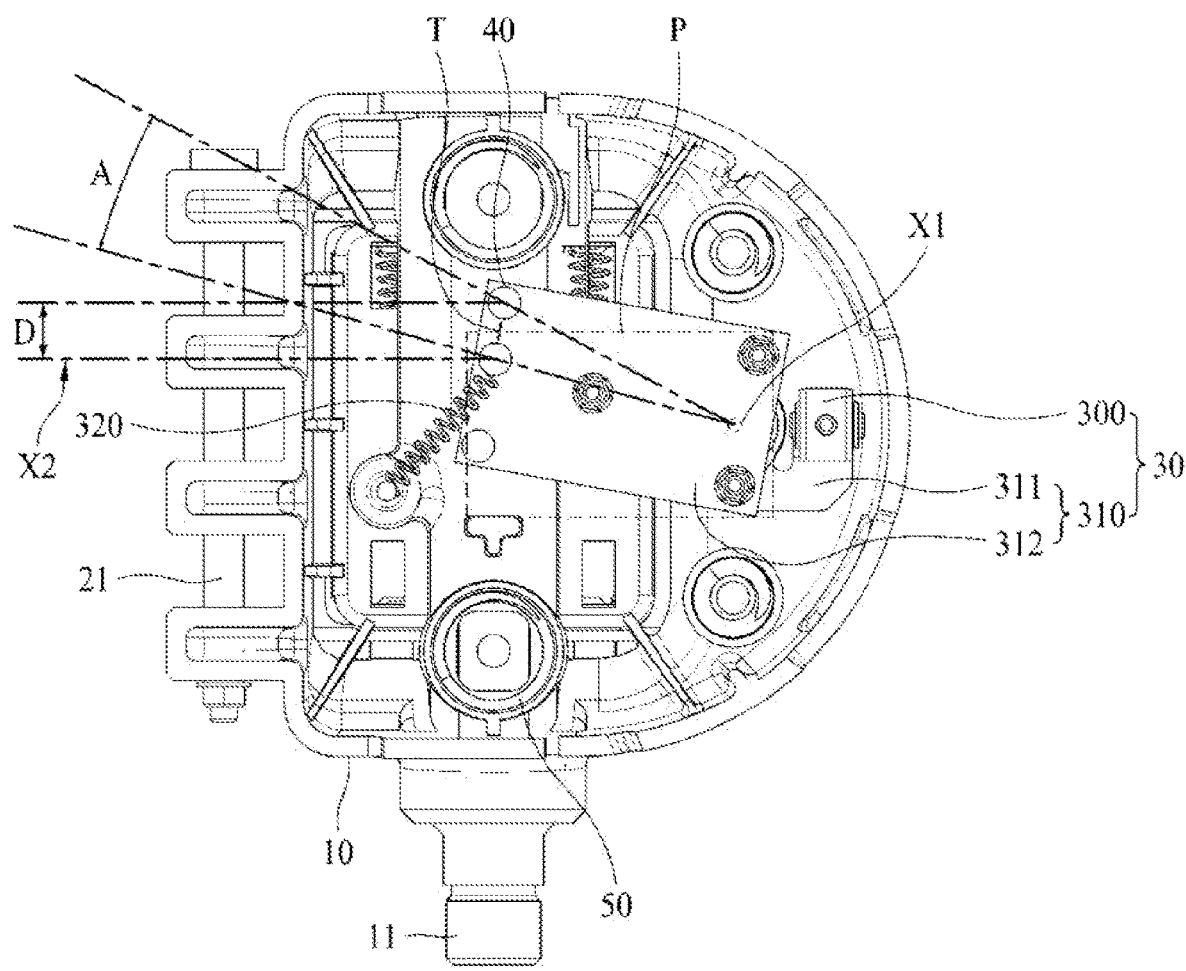
FIG. 4 is a plane view illustrating the inside of the pedal for a bicycle illustrated in FIG. 1.

FIG. 1 is a perspective view schematically illustrating a pedal 1 for a bicycle according to an embodiment of the present disclosure. FIG. 2 is a diagram illustrating the inside of the pedal 1 for a bicycle illustrated in FIG. 1. FIG. 3 is a side view of the pedal 1 for a bicycle illustrated in FIG. 1. FIG. 4 is a plane view illustrating the inside of the pedal 1 for a bicycle illustrated in FIG. 1.

Referring to FIGS. 1 to 4, the pedal 1 for a bicycle according to an embodiment of the present disclosure includes a case 10, an upper plate 20, a displacement generation assembly 30, and a sensing unit 40 in order to precisely and accurately calculate the quantity of exercise of a bicycle rider.

The case 10 may be rotatable around a spindle 11. The spindle 11 may be connected to the driving arm of a bicycle, which is not illustrated. The driving arm is connected to a driving shaft (not illustrated) that rotates a wheel through a chain not illustrated, etc. Accordingly, the pedal 1 for a bicycle may rotate the wheel (not illustrated) through the driving arm.

The upper plate 20 is connected to the case 10 by a pivot shaft 21. Accordingly, the upper plate 20 may be rotated around the pivot shaft 21. The displacement generation assembly 30 is disposed within the case 10. The displacement generation assembly 30 is connected to the case 10 and the upper plate 20, and generates a displacement in response to the rotation of the upper plate 20. The sensing unit 40 is connected to the displacement generation assembly 30, and detects the displacement.

A bicycle rider may exercise by stepping on the pedal 1. In this case, the quantity of exercise may be different depending on pressure that is applied to the pedal 1 by the bicycle rider. In particular, in a bicycle for indoor exercise, a load may be applied to the rotation of a wheel for each exercise step. In this case, although the RPM of the wheel is the same, pressure that is applied to the pedal 1 for a bicycle is increased in the state in which a load is large. Accordingly, although the RPM of the wheel is the same, the quantity of exercise is different depending on pressure that is applied to the pedal 1 for a bicycle by the bicycle rider. In the present disclosure, a change in pressure that is applied to the pedal 1 for a bicycle by a bicycle rider is measured, and accordingly, the quantity of exercise can be precisely calculated.

The sensing unit 40 is moved along a predetermined trajectory T between case 10 and the upper plate 20 by the displacement generation assembly 30. In this case, the trajectory T of the sensing unit 40 is disposed on one plane P. The one plane P is disposed between the upper plate 20 and the case 10. Specifically, the one plane P is disposed in parallel to the pivot shaft 21 and the spindle 11. That is, the trajectory T of the sensing unit 40 is parallel to the pivot shaft 21 and the spindle 11. In this case, the pivot shaft 21 and the spindle 11 are parallel to each other.

Figure 5:
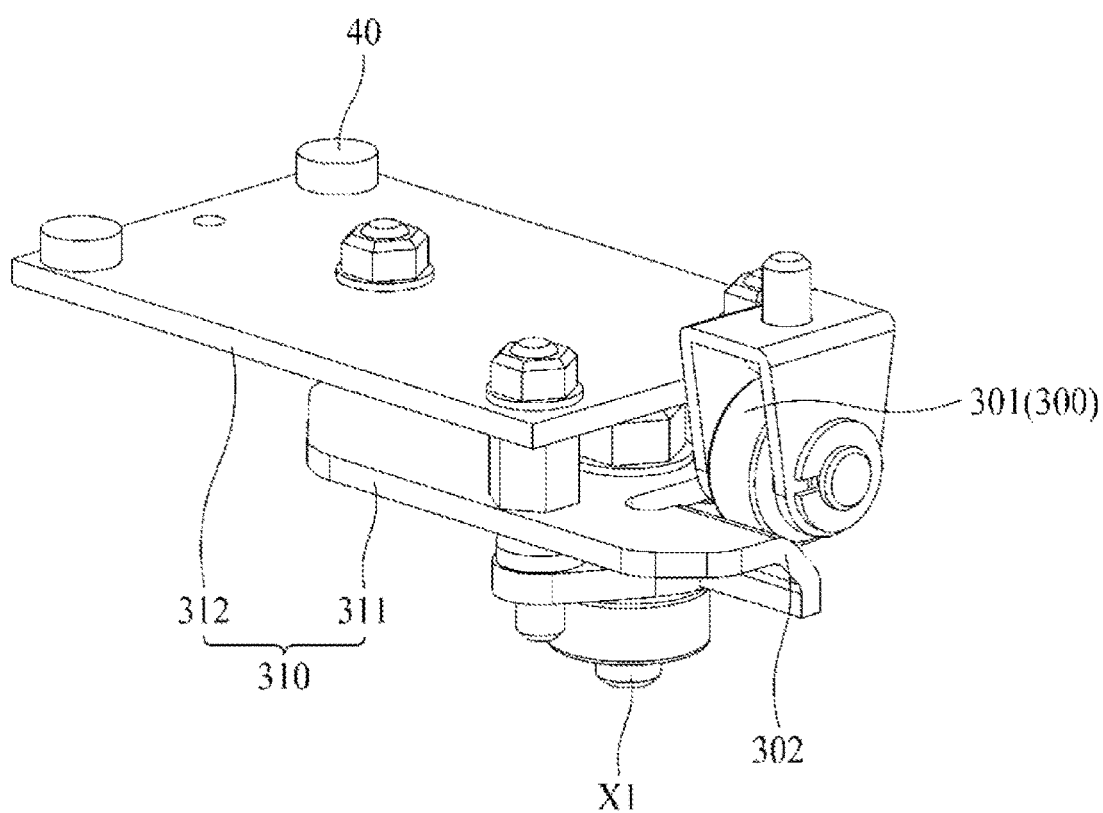
FIG. 5 is a perspective view schematically illustrating a displacement generation assembly illustrated in FIG. 2.
Figure 6:
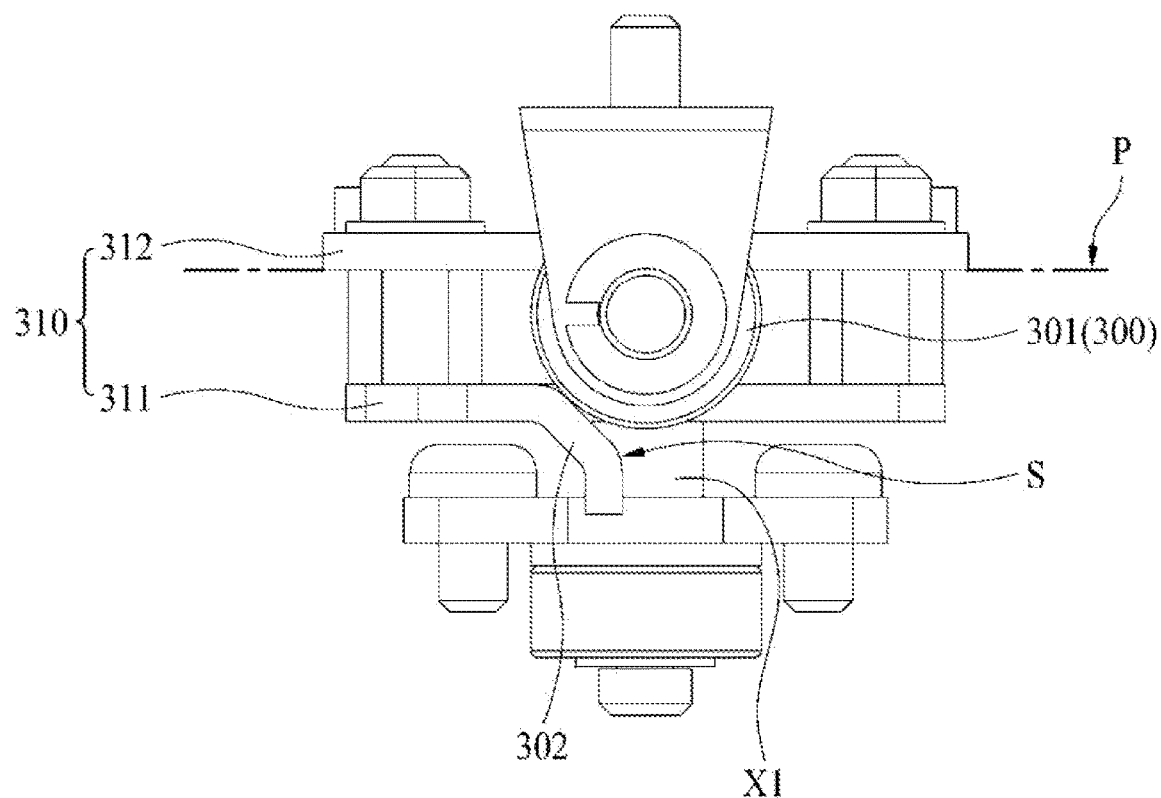
FIG. 6 is a side view of the displacement generation assembly illustrated in FIG. 5.
Figure 7:
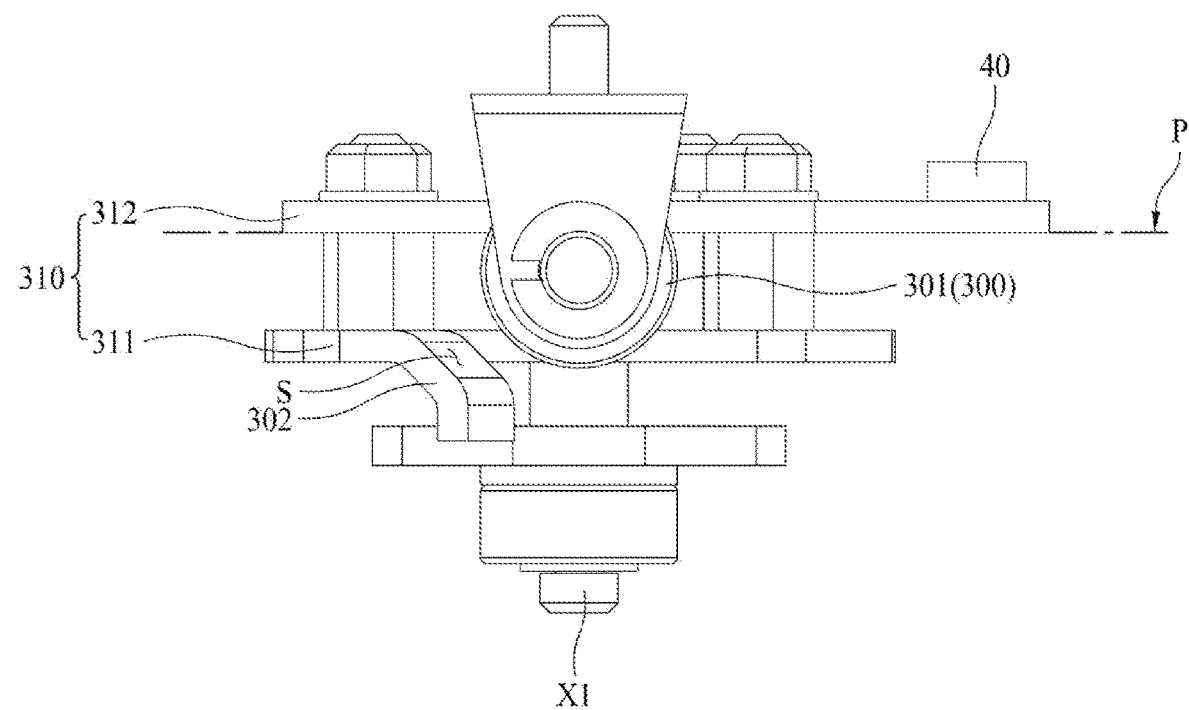
FIG. 7 is a diagram for describing an operation of a main moving part and a follower moving part illustrated in FIG. 6.

FIG. 5 is a perspective view schematically illustrating the displacement generation assembly 30 illustrated in FIG. 2. FIG. 6 is a side view of the displacement generation assembly 30 illustrated in FIG. 5. FIG. 7 is a diagram for describing an operation of a main moving part 300 and a follower moving part 310 illustrated in FIG. 6.

Referring to FIGS. 1 to 7, the displacement generation assembly 30 includes the main moving part 300 and the follower moving part 310. The main moving part 300 is connected to the upper plate 20. The follower moving part 310 is connected to the case 10. The follower moving part 310 is displaced by the main moving part 300, and moves the sensing unit 40 along the predetermined trajectory T.

As an embodiment, any one of the main moving part 300 and the follower moving part 310 includes a roller 301. The other of the main moving part 300 and the follower moving part 310 includes a contact part 302. The contact part 302 has at least one of an inclined surface S and a curved surface toward the main moving part 300. The contact part 302 may be gradually inclined downward from the main moving part 300 toward the main moving part 300. Accordingly, when the main moving part 300 is rotated downward from the main moving part 300 on the basis of the pivot shaft 21, the main moving part 300 gradually pushes the contact part 302. In this case, the follower moving part 310 may be rotated around the displacement axis X1. By the roller 301 and the contact part 302, the follower moving part 310 may smoothly change one exercise direction of the main moving part 300 into the other exercise direction thereof.

The follower moving part 310 includes a follower body 311 and a PCB panel 312. The follower body 311 has the contact part 302 disposed on one side thereof. The follower body 311 may be rotated around a displacement axis X1 by the main moving part 300. The displacement axis X1 may be disposed perpendicularly to the one plane P along which the predetermined trajectory T of the sensing unit 40 passes. Accordingly, a movement of the main moving part 300 may be changed into the rotation of the follower moving part 310 on the basis of the displacement axis X1. That is, the rotation of the upper plate 20 can be precisely detected in spite of narrow spatial limitations.

The pedal 1 for a bicycle is rotated around the spindle 11 and the driving shaft (not illustrated). That is, the sensing unit 40 needs to precisely measure a change in pressure that is applied to the upper plate 20 regardless of the rotation of the case 10. The displacement generation assembly 30 according to the present disclosure moves the sensing unit 40 on the one plane P disposed between the upper plate 20 and the case 10. Since the one plane P itself is moved along with the case 10, if the sensing unit 40 is moved on the one plane P, the sensing unit 40 can precisely detect only a change in pressure that is applied to the upper plate 20. That is, the sensing unit 40 can precisely measure a change in pressure according to the rotation of the upper plate 20 regardless of rotation thereof on the basis of the spindle 11 or the driving shaft (not illustrated).

Meanwhile, the sensing unit 40 is spaced apart from the displacement axis X1 and is disposed toward the pivot shaft 21. That is, the sensing unit 40 is disposed the displacement axis X1 and the pivot shaft 21. Accordingly, the sensing unit 40 may be spaced apart from far away and disposed from the displacement axis X1. In this case, the sensing unit 40 may have a great displacement on the basis of the displacement axis X1. That is, although the contact part 302 is relatively small displaced by the main moving part 300, the sensing unit 40 may be relatively greatly displaced. Accordingly, a sufficient sensing range of the sensing unit 40 can be secured.

The sensing unit 40 may sense at least one of a rotation angle A and a linear displacement quantity D. The rotation angle A is a rotation angle of the sensing unit 40 based on the displacement axis X1. The linear displacement quantity D refers to a moving distance of the straight line X2 in the direction of the pivot shaft 21, which passes through the center of the sensing unit 40 and is perpendicular to the pivot shaft 21. As an embodiment, the sensing unit 40 may be at least one selected from an acceleration sensor, a gyro sensor, and a 6-axis sensor. Preferably, the sensing unit 40 may be a 6-axis sensor. The sensing unit 40 may be disposed in the PCB panel 312.

Meanwhile, the first return spring 320 restores the follower moving part 310, displaced by the main moving part 300, to its original location. A first return spring 320 may be connected to the case 10 and the follower moving part 310. Furthermore, a second return spring 50 restores the upper plate 20, rotated by a bicycle rider, to its original location. The second return spring 50 may be disposed in a plural number. Some of the plurality of second return springs 50 may be disposed to face the remainder of the plurality of second return springs 50 with the displacement generation assembly 30 interposed therebetween.

Although the invention invented by the present applicant has been specifically described based on the embodiment, the present disclosure is not limited to the embodiment, and may be changed in various ways without departing from the subject matter of the present disclosure.

The invention claimed is:
1. A pedal for a bicycle comprising:
a case capable of rotating around a spindle;
an upper plate connected to the case by a pivot shaft and capable of rotating around the pivot shaft;
a displacement generation assembly disposed within the case, connected to the case and the upper plate, and configured to generate a displacement in response to the rotation of the upper plate; and
a sensing unit connected to the displacement generation assembly and configured to detect a displacement, wherein the sensing unit is moved along a predetermined trajectory between the case and the upper plate by the displacement generation assembly.

2. The bicycle of claim 1, wherein the trajectory of the sensing unit is parallel to the pivot shaft.

3. The bicycle of claim 1, wherein the pivot shaft and the spindle are parallel to each other.

4. The bicycle of claim 1, wherein the displacement generation assembly comprises:
a main moving part connected to the upper plate; and
a follower moving part connected to the case, displaced by the main moving part, and configured to move the sensing unit along the predetermined trajectory.

5. The bicycle of claim 4, wherein:
any one of the main moving part and the follower moving part comprises a roller, and
the other of the main moving part and the follower moving part comprises a contact part having at least one of an inclined surface or a curved surface.

6. The bicycle of claim 4, wherein the follower moving part is rotated around a displacement axis by the main moving part.

7. The bicycle of claim 6, wherein the displacement axis is perpendicular to one plane through which the predetermined trajectory of the sensing unit passes.

8. The bicycle of claim 6, wherein the sensing unit is spaced apart from the displacement axis and disposed toward the pivot shaft.

9. The bicycle of claim 1, wherein the sensing unit senses at least one of a rotation angle and a linear displacement quantity for one axis.

* * * * *